US012539249B1

(12) United States Patent
Xu

(10) Patent No.: US 12,539,249 B1
(45) Date of Patent: Feb. 3, 2026

(54) MASTURBATION CUP WITH BRACKET STRUCTURE

(71) Applicant: Haiting Xu, Fuzhou (CN)

(72) Inventor: Haiting Xu, Fuzhou (CN)

( * ) Notice: Subject to any disclaimer, the term of this patent is extended or adjusted under 35 U.S.C. 154(b) by 0 days.

(21) Appl. No.: 19/036,136

(22) Filed: Jan. 24, 2025

(51) Int. Cl.
*A61H 19/00* (2006.01)

(52) U.S. Cl.
CPC ..... *A61H 19/32* (2013.01); *A61H 2201/0107* (2013.01); *A61H 2201/0153* (2013.01)

(58) Field of Classification Search
CPC ...................................................... A61H 19/32
See application file for complete search history.

(56) References Cited

U.S. PATENT DOCUMENTS

2012/0207462 A1* 8/2012 Justice .................. F16M 11/40 396/428
2018/0344565 A1* 12/2018 Sloan ..................... A61H 19/32
2020/0219614 A1* 7/2020 Bjørkmann ......... H04L 63/0421
2024/0277561 A1* 8/2024 Cambridge ............ A61H 19/44
2025/0107785 A1* 4/2025 Chen ...................... A61H 19/32

FOREIGN PATENT DOCUMENTS

CN 204274965 U 4/2015
CN 209366049 U * 9/2019
TW M643546 U * 7/2023
WO WO-2023215149 A1 * 11/2023 ............... A61F 5/41

OTHER PUBLICATIONS

Leten 10 Thrusting High Speed Motor Masturbator Cup With Phone Holder, https://www.leten.co/product/leten-10-thrusting-high-speed-motor-masturbator-cup-with-phone-holder/, backdated to at least Jun. 14, 2024 via web.archive.org ("The Wayback Machine"). (Year: 2024).*

MoonHorn, found at https://babejuicy.com/products/moonhorn-app-control-suction-and-vibrating-male-masturbator-with-phone-holder and backdated to at least Jan. 20, 2025 via the Wayback Machine (Year: 2025).*

* cited by examiner

*Primary Examiner* — Thaddeus B Cox

(74) *Attorney, Agent, or Firm* — Rondaus PLLC; George Liu

(57) ABSTRACT

Disclosed is a masturbation cup with a bracket structure, including a main body and a bracket, wherein the main body includes a hard casing with an inner cavity, and a flexible wall provided in the inner cavity; the flexible wall is provided with a channel through which the male genitalia can enter; and the bracket is arranged on a wall surface of the hard casing and is configured to clamp a playback device. Due to arrangement of the hard casing and the flexible wall, the hard casing serves as a support structure and is held by the hand, and the flexible wall has the channel through which the male genitalia can enter. The bracket is directly arranged on the hard casing, which enables the playback device to directly play audio and video, thus achieving the dual stimulation of vision and genitalia and improving the user experience.

1 Claim, 9 Drawing Sheets

MASTURBATION CUP WITH BRACKET STRUCTURE

TECHNICAL FIELD

The present disclosure relates to the field of sex aids, in particular to a masturbation cup with a bracket structure.

BACKGROUND

A masturbation cup belongs to the category of portable male masturbators. In modern society, where stress is high, the masturbation cup helps relieve the venting of men's sexual desires.

When using a masturbation cup, a man often achieves a predetermined visual experience and stimulation of the male genitalia by watching movies or doing so. The current practice is generally to set up a special bracket or tabletop for placing a masturbation cup. When a screen is small, it is easy to experience a decrease in visual quality, which affects the user experience.

SUMMARY

The main objective of the present disclosure is to propose a masturbation cup with a bracket structure, which is intended to combine the bracket structure with the masturbation cup, and then realize that a man can directly watch movies when using the masturbation cup, thereby achieving dual enjoyment of visual and sexual stimulation and improving the user experience.

To achieve the above objective, the present disclosure provides a masturbation cup with a bracket structure, including:

- a main body, including a hard casing with an inner cavity, and a flexible wall provided in the inner cavity, the flexible wall being provided with a channel through which the male genitalia can enter; and
- a bracket, arranged on a wall surface of the hard casing and configured to clamp a playback device.

In practical design, due to arrangement of the hard casing and the flexible wall, the hard casing serves as a support structure and is held by the hand, and the flexible wall has the channel through which the male genitalia can enter. The bracket is directly arranged on the hard casing, which enables the playback device to directly play audio and video, thus achieving the dual stimulation of vision and genitalia and improving the user experience.

Moreover, the combination of the hard casing and the bracket also enlarges the holding area of the masturbation cup, thereby improving the grip feel of the masturbation cup.

The hard casing may also be equipped with actuating devices, such as a telescopic structure and a vibration structure, so as to apply predetermined stimulus sources to the flexible wall located inside the inner cavity.

Figure 1:
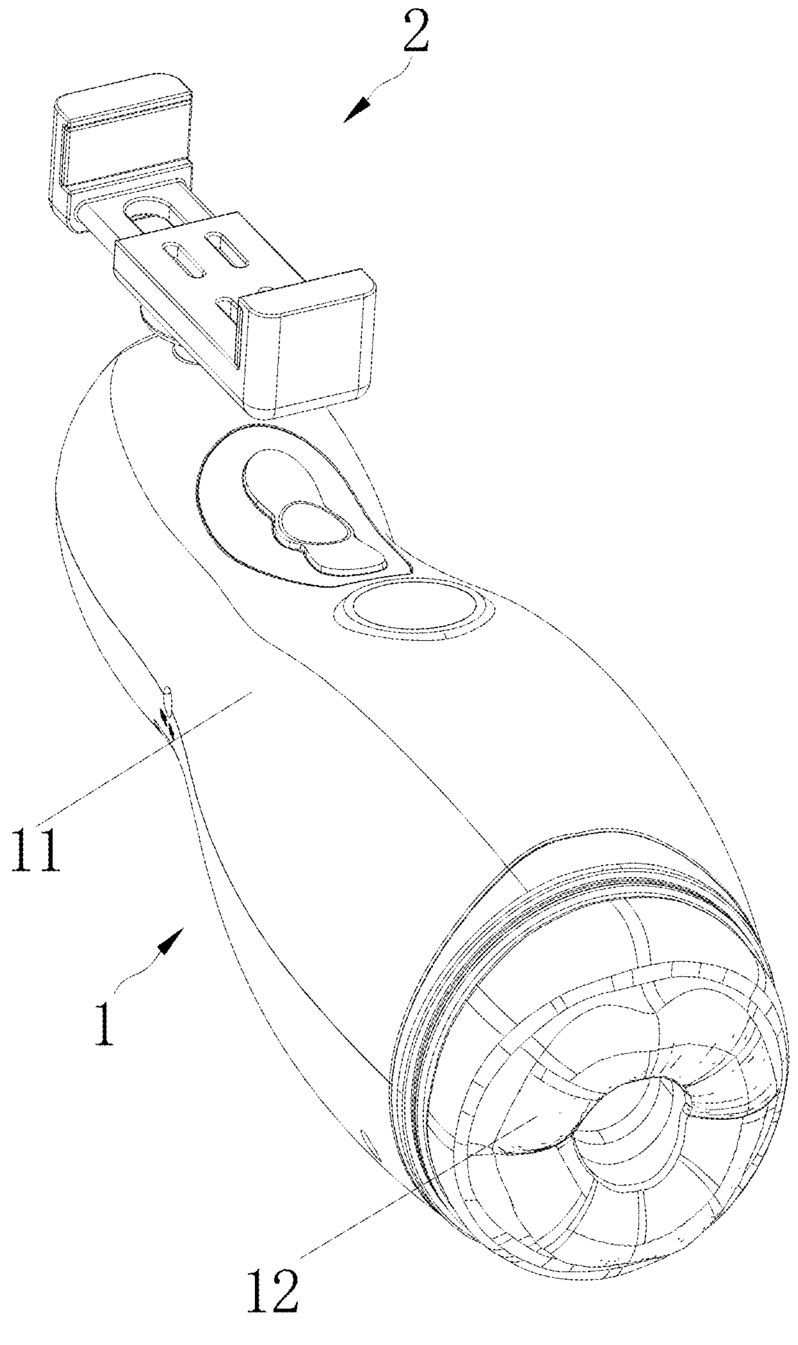
FIG. 1 is a schematic diagram I of a first embodiment of the present disclosure.

In figures,

- 1 denotes a main body, 11 denotes a hard casing, 11*a* denotes an inner cavity, 12 denotes a flexible wall, 12*a* denotes a channel,
- 2 denotes a bracket, 21 denotes a base,
- 3 denotes a clamping seat,
- 31 denotes a positioning portion, 31*a* denotes a first clamping portion, 32 denotes an adjusting portion, 32*a* denotes a second clamping portion,
- 33 denotes a magnetic suction seat,
- 34 denotes a bracing strip,
- 35 denotes a clamping hoop, 35*a* denotes a fixing ring, 35*b* denotes a snap ring,
- 36 denotes clamping plates,
- 37 denotes elastic rope bodies,
- 41 denotes a positioning hole, 42 denotes a positioning column, and
- 5 denotes a universal joint.

DETAILED DESCRIPTION OF THE EMBODIMENTS

The technical solutions in embodiments of the present disclosure will be described clearly and completely hereinafter with reference to the accompanying drawings. Apparently, the described embodiments are only a part rather than all of the embodiments of the present disclosure. Based on the embodiments of the present disclosure, all other embodiments obtained by those of ordinary skill in the art without making creative efforts shall fall within the protection scope of the present disclosure.

It should be noted that if there are directional indications (such as upper, lower, left, right, front, back, top, bottom, inner, outer, vertical, horizontal, longitudinal, counterclockwise, clockwise, circumferential, radial, axial . . . ) involved in the embodiments of the present disclosure, the directional indications are only used to explain a relative position relationship and motion situation between components in a specific posture (as shown in the figure). If the specific posture changes, the directional indication also changes accordingly.

Moreover, if there are descriptions related to “first”, “second”, and the like in the embodiments of the present disclosure, the descriptions of “first”, “second”, and the like are only used for descriptive purposes, and cannot be understood as indicating or implying their relative importance or implying the number of indicated technical features. Therefore, the features defined with “first” and “second” may explicitly or implicitly include at least one of these features. In addition, the technical solutions of various embodiments can be combined with each other, which must be based on what those of ordinary skill in the art can achieve. When the combination of the technical solutions is contradictory or impossible to achieve, it should be considered that the combination of such technical solutions does not exist and is not within the scope of protection of the present disclosure.

As shown in FIG. 1 to FIG. 9, a masturbation cup with a bracket structure includes:

a main body 1, including a hard casing 11 with an inner cavity 11*a*, and a flexible wall 12 provided in the inner cavity 11*a*, the flexible wall 12 being provided with a channel 12*a* through which the male genitalia can enter; and a bracket 2, arranged on a wall surface of the hard casing 11 and configured to clamp a playback device.

In practical design, due to arrangement of the hard casing 11 and the flexible wall 12, the hard casing 11 serves as a support structure and is held by the hand, and the flexible wall 12 has the channel 12*a* through which the male genitalia can enter. The bracket 2 is directly arranged on the hard casing 11, which enables the playback device 100 to directly play audio and video, thus achieving the dual stimulation of vision and genitalia and improving the user experience.

Moreover, the combination of the hard casing 11 and the bracket 12 also enlarges the holding area of the masturbation cup, thereby improving the grip feel of the masturbation cup.

The hard casing 11 may also be equipped with actuating devices, such as a telescopic structure and a vibration structure, so as to apply predetermined stimulus sources to the flexible wall 12 located inside the inner cavity 11*a*.

Specifically, the bracket 2 includes a base 21 arranged on the hard casing 11 and a clamping seat 3 arranged on the base 21, and the clamping seat 3 is used for placement and playing of audio and video. The hard casing 11 is a carrier for the base 21, and an outer wall of the hard casing 11 may be covered with an elastic layer, thereby improving the hand feeling of the masturbation cup and also achieving a waterproof effect.

Specifically, the clamping seat 3 is a magnetic suction seat 33, and the magnetic suction seat 33 includes a plate body provided with circumferentially distributed magnets. Due to arrangement of the magnetic suction seat 33, the existing structures such as a magnetic suction mobile phone and a magnetic suction tablet can be conveniently fixed by magnetic attraction. Therefore, the structure is simple, the stability is also good, and the playback device can be rotated or adjusted at different angles according to actual needs.

Specifically, the base 21 and magnetic suction seat 33 are integrally formed or detachably arranged, so as to meet different requirements.

Specifically, the clamping seat 3 includes a positioning portion 31 provided on the base 21 and an adjusting portion 32 slidably mounted on the positioning portion 31, the positioning portion 31 and the adjusting portion 32 are respectively provided with a first clamping portion 31*a* and a second clamping portion 32*a* arranged opposite to each other, a clamping section is defined by the first clamping portion 31*a* and the second clamping portion 32*a*, and the adjustable clamping section is used for placing the playback device. A spring may be arranged for the clamping between the positioning portion 31 and the adjusting portion 32, so as to realize the relative movement of the adjusting portion 32.

Specifically, the base 21 and the positioning portion 31 are integrally formed, so that their structural stability is good, and there is no need for fixation. Accordingly, the base 21 and positioning portion 31 are fixed at a certain angle.

Specifically, the base 21 and the positioning portion 31 are detachably arranged. Accordingly, the base 21 and the positioning portion 31 may be in a fixed structure, e.g., a threaded connection, or the angle of the base 21 and the positioning portion 31 may be adjusted through an existing universal joint 5.

Figure 9:
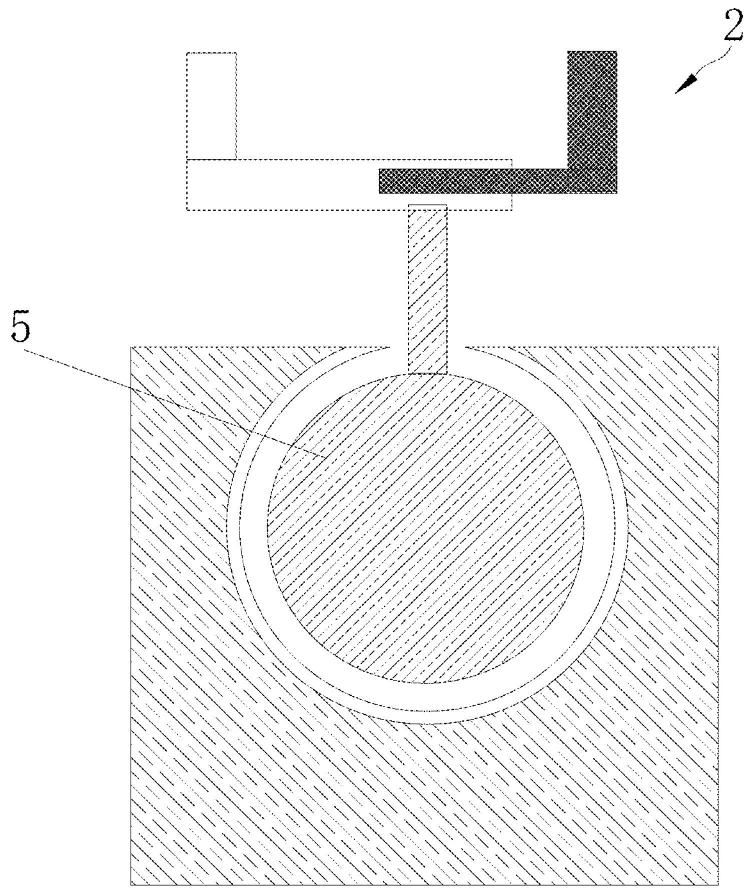
FIG. 9 is a schematic diagram of a seventh embodiment of the present disclosure.

Specifically, as shown in FIG. 9, the base 21 and the positioning portion 31 are fixed to each other by means of the universal joint 5.

Specifically, the base 21 is detachably mounted on the hard casing 11.

Figure 8:
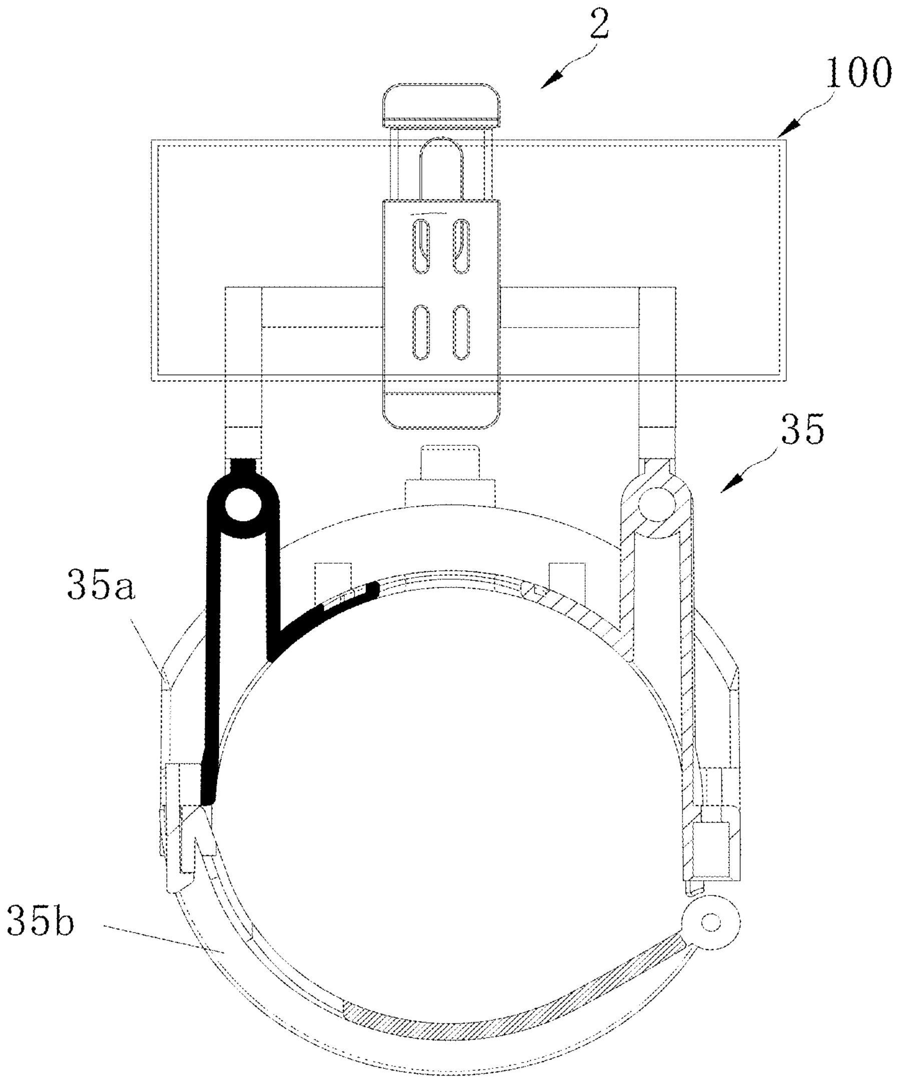
FIG. 8 is a schematic diagram of a sixth embodiment of the present disclosure.

Specifically, as shown in FIG. 8, the base 21 is a clamping hoop 35, and the clamping hoop 35 is arranged in a detachable manner; and a clamping hoop chamber with a size adapting to the hard casing 11 is defined by the clamping hoop 35, and is fixed to an outer peripheral wall of the hard casing 11, so that a detachable structure is realized.

Specifically, the clamping hoop 35 includes a fixing ring 35*a* and a snap ring 35*b* detachably mounted on the fixing ring, one end of the fixing ring is in pivoted connection with the snap ring, the other end thereof is provided with a buckle, and the base 21 is arranged on a wall surface of the fixing ring.

Figure 3:
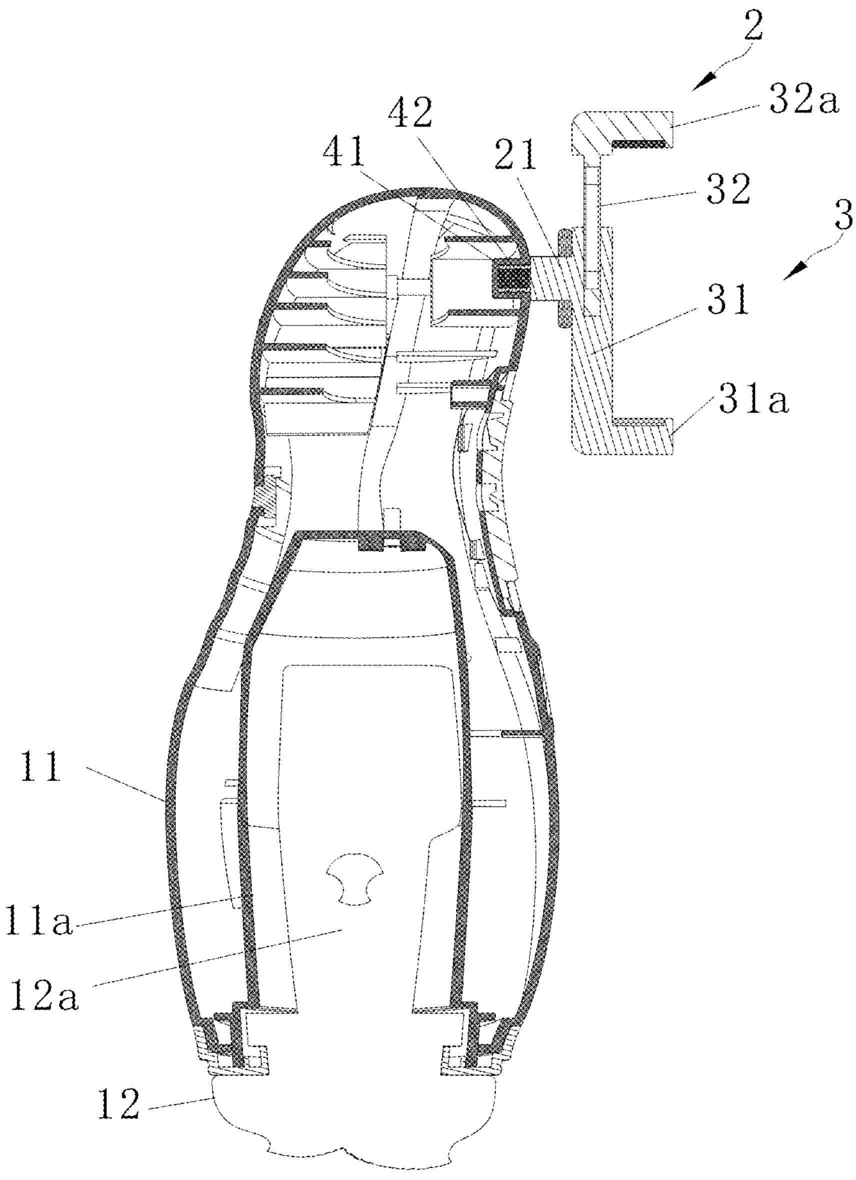
FIG. 3 is a three-dimensional schematic diagram of the first embodiment of the present disclosure.
Figure 4:
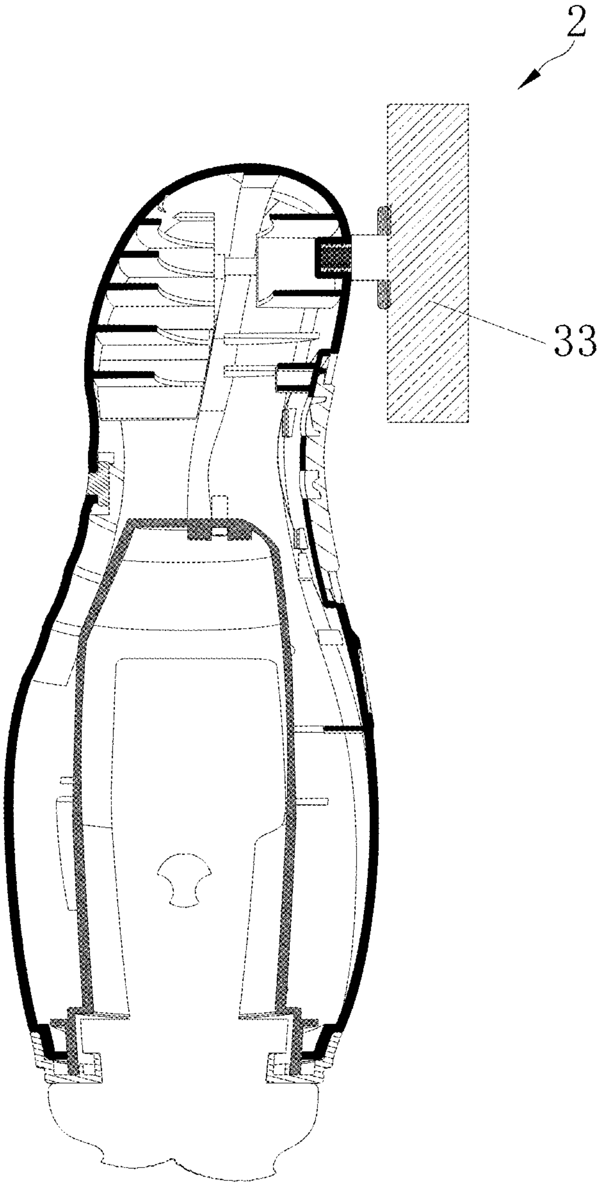
FIG. 4 is a schematic diagram of a second embodiment of the present disclosure.

Specifically, as shown in FIG. 3 and FIG. 4, the hard casing 11 is provided with a positioning hole 41, and the base 21 is provided with a positioning column 42 matched with the positioning hole 41. Of course, specifically, a rubber plug may be arranged in the positioning hole to block the base 21 when it is disassembled, thereby improving the aesthetic appeal.

Specifically, the positioning hole is provided with an internal thread, and the positioning column is provided with an external thread matched with the internal thread. The base 21 can be directly fixed by means of the external and internal threads.

Specifically, the base 21 is fixed to the hard casing 11, for example, the magnetic suction seat 33 may be directly mounted on the base 21, or detachably mounted thereon.

Specifically, the base 21 is fixed to the hard casing 11 by riveting, integrated injection molding, buckling or adhesive bonding, thereby reducing damage between the base 21 and the hard casing 11 and prolonging their service lives.

Figure 6:
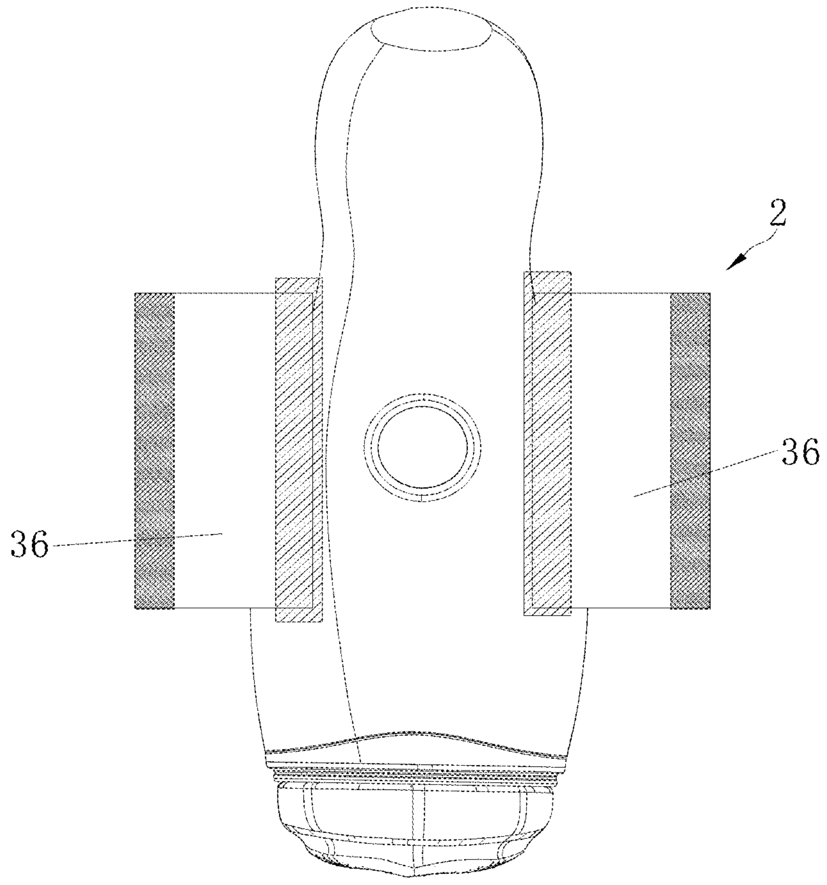
FIG. 6 is a schematic diagram of a fourth embodiment of the present disclosure.

Specifically, as shown in FIG. 6, there are relatively sliding clamping plates 36 on both sides of the hard casing 11, the hard casing 11 is provided with guide slide grooves, the clamping plates 36 are slidably mounted in the guide slide grooves, and end portions of the two clamping plates 36 away from each other are respectively provided with clamping portions. A double sliding structure is adopted to realize clamping of the device. In one embodiment, the clamping plates 36 may be equipped with a locking structure, so as to serve as a gripping structure for the hands.

Specifically, an outer wall of the hard casing 11 is covered with a flexible layer, which improves the hand feeling of the masturbation cup.

Figure 7:
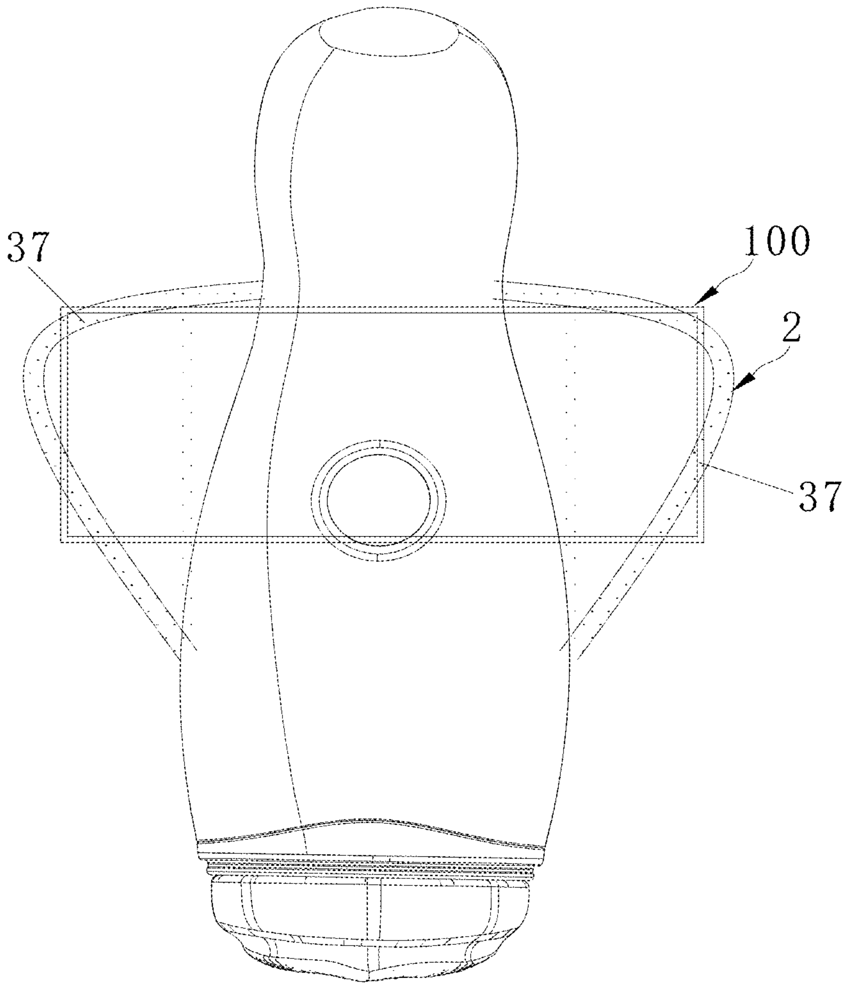
FIG. 7 is a schematic diagram of a fifth embodiment of the present disclosure.

Specifically, as shown in FIG. 7, two elastic rope bodies 37 are respectively arranged at the two sides of the hard casing 11; and when a rear wall of the playback device is in contact with the hard casing 11, the elastic rope bodies apply a backward elastic force to a front wall of the playback device away from the hard casing 11, so that the playback device is stuck on the hard casing 11.

Specifically, the bracket 2 is located on the outer peripheral wall of the hard casing 11, e.g., the clamping hoop, or the bracket 2 is located on a top wall of the hard casing 11.

Figure 5:
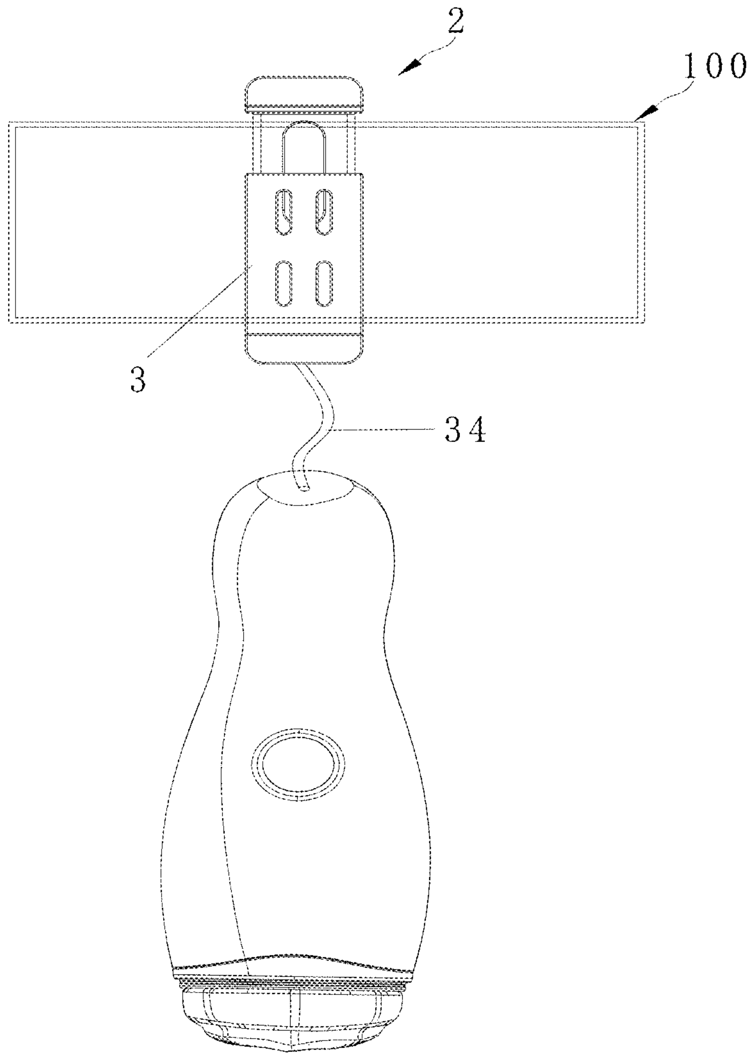
FIG. 5 is a schematic diagram of a third embodiment of the present disclosure.

Specifically, as shown in FIG. 5, the base 21 is a deformable bracing strip 34, and the bracing strip 34 is available for adjustment of the relative position of the bracket 2, for example, the structure of the universal joint 5, where the bracing strip 34 is the prior art, e.g., memory metal.

Figure 2:
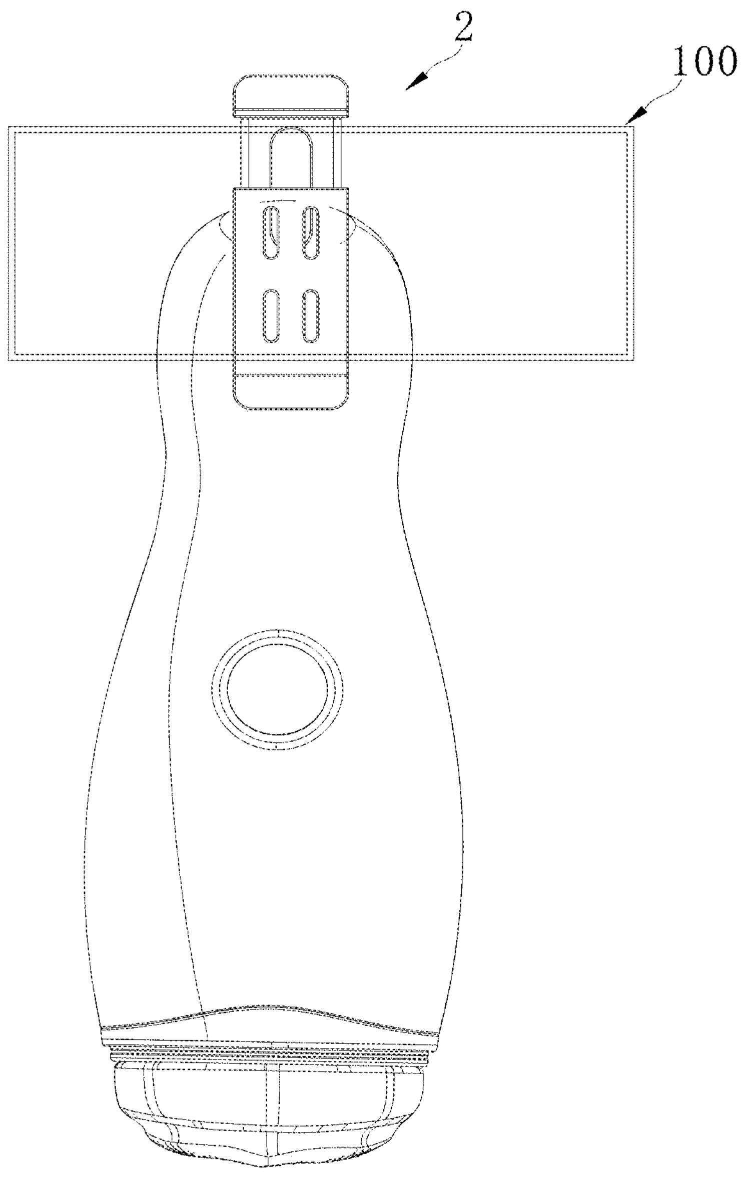
FIG. 2 is a schematic diagram II of the first embodiment of the present disclosure.

FIG. 1 to FIG. 3 show the first embodiment, which includes the base 21, the positioning portion 31, and the adjusting portion 32, where the base 21 and the hard casing 11 may be integrally formed or detachably arranged.

FIG. 4 shows the second embodiment, which includes the base 21 and the magnetic suction seat 33, and the base 21 and the hard casing 11 are integrally formed or detachably arranged.

FIG. 5 shows the third embodiment: the base 21 cooperates with the bracing strip 34, where the bracing strip 34 may bent and deformed, and the base 21 and the hard casing 11 are integrally formed or detachably arranged.

FIG. 6 shows the fourth embodiment: there are relatively sliding clamping plates, and the clamping plates slide relative to the hard casing 11.

FIG. 7 shows the fifth embodiment: the elastic rope bodies are fixedly arranged on the hard casing 11.

FIG. 8 shows the sixth embodiment: the clamping hoop, the positioning portion 31, and adjusting portion 32 are combined for use, and preferably, a groove is provided in the hard casing 11 for limiting the clamping hoop.

FIG. 9 shows the seventh embodiment: the cooperation between the base 21 and the universal joint 5 allows for the adjustment of the relative angle of the clamping seat 3.

The foregoing descriptions are merely exemplary embodiments of the present disclosure, and are not intended to limit the patent scope of present disclosure. Under the inventive concept of the present disclosure, equivalent structural variations made by using the contents of the description and drawings of the present disclosure, or direct/indirect applications of the contents thereof in other related technical fields shall be included in the patent protection scope of the present disclosure.

What is claimed is:

1. A masturbation cup with a bracket structure, comprising:

a main body, comprising a hard casing with an inner cavity, and a flexible wall provided in the inner cavity, the flexible wall being provided with a channel through which a male genitalia can enter; and a bracket, arranged on a wall surface of the hard casing and configured to clamp a playback device;

wherein the bracket comprises a base arranged on the hard casing and a clamping seat arranged on the base, and the clamping seat is used for placement and playing of audio and video;

wherein the clamping seat comprises a positioning portion provided on the base and an adjusting portion slidably mounted on the positioning portion, the positioning portion and the adjusting portion are respectively provided with a first clamping portion and a second clamping portion arranged opposite to each other, an adjustable clamping section is defined by the first clamping portion and the second clamping portion, and the adjustable clamping section is used for placing the playback device;

wherein the base and the positioning portion are detachably arranged;

wherein the base and the positioning portion are fixed to each other by means of a universal joint;

wherein the base is a clamping hoop, and the clamping hoop is detachably arranged on the hard casing; and the clamping hoop is configured to form a clamping hoop chamber that cooperates with the hard casing, and is fixed to an outer peripheral wall of the hard casing;

wherein the clamping hoop comprises a fixing ring and a snap ring detachably mounted on the fixing ring, one end of the fixing ring is in pivoted connection with the snap ring, another end thereof is provided with a buckle, and the base is arranged on a wall surface of the fixing ring.

* * * * *